Feb. 10, 1931. C. S. NELSON 1,792,439
HOIST LINE SLING
Filed Feb. 28, 1930
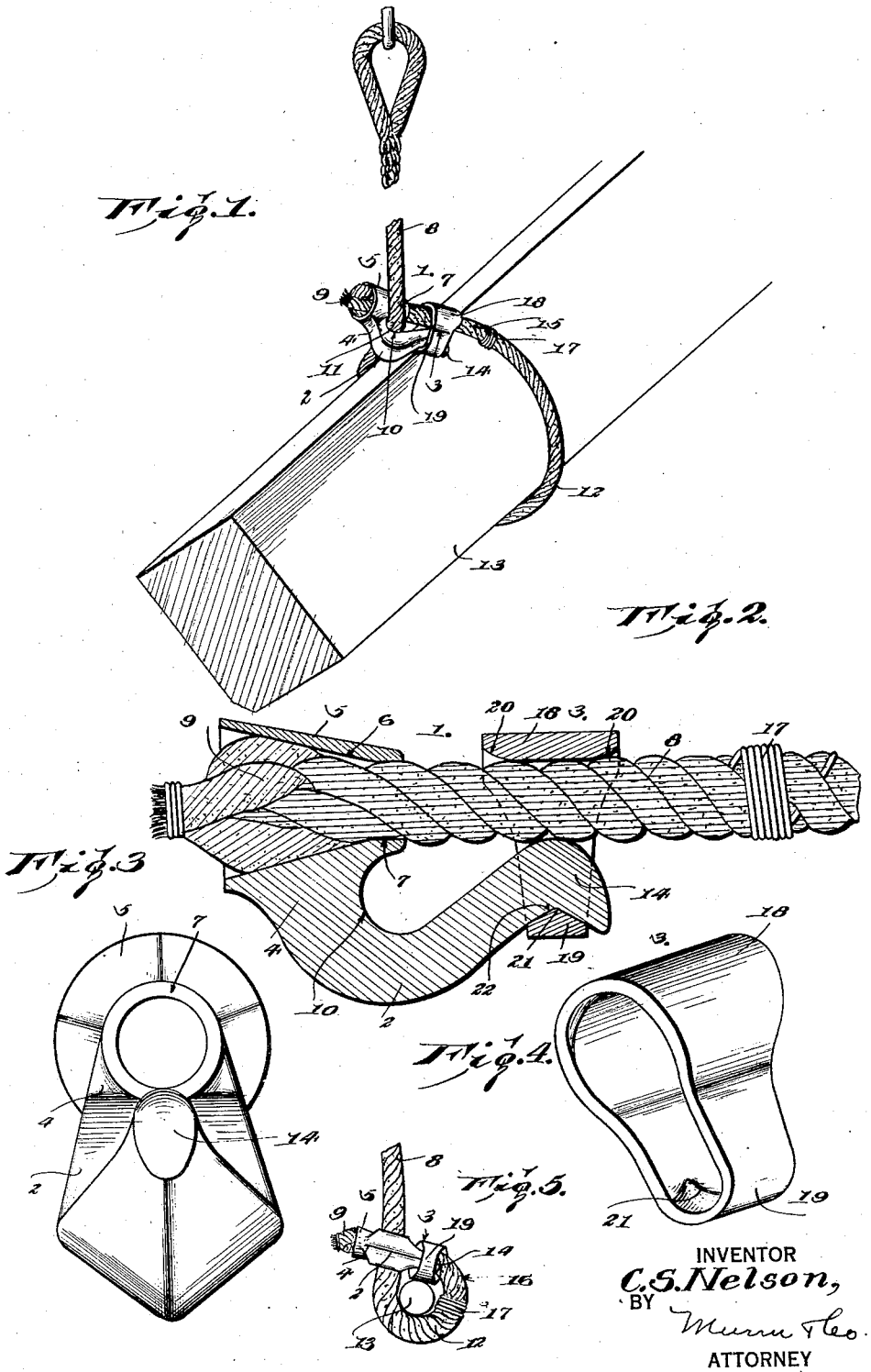
INVENTOR
C. S. Nelson,
BY
ATTORNEY Patented Feb. 10, 1931

1,792,439

UNITED STATES PATENT OFFICE

CHARLES SAMUEL NELSON, OF QUEBEC, QUEBEC, CANADA

HOIST-LINE SLING

Application filed February 28, 1930, Serial No. 432,155, and in Canada February 15, 1930.

This invention relates to improvements in hoist-line slings, and it consists of the constructions, combinations and arrangements herein described and claimed.

An object of the invention is to provide a hoist-line sling of which the ability to make both a quick connection and disconnection with the load is but one of the several outstanding advantages.

Another object of the invention is to provide a hoist-line sling which, by virtue of the peculiar connection of the hook with the cable makes it possible to apply a perfect loop to a load of an extremely small diameter, this particular advantage also being due to the elimination of eye, splice and other connections with the cable or line, customarily used with hooks of known types.

Another object of the invention is to provide a hoist-line sling embodying a loop hook which by virtue of its peculiar construction has the advantage of substantially centering itself into a hanging position over the load.

A further object of the invention is to provide a hoist-line sling which is admirably adaptable as a tow line, under which circumstance the loop hook, by virtue of its particular construction, will stay in place even when the line is slack.

Other objects and advantages will appear in the following specification, reference being had to the accompanying drawing, in which Figure 1 is a perspective view of the improved hoist-line sling, the load embraced by the cable loop in this instance comprising a beam.

Figure 2 is a longitudinal section of the loop hook and link, that portion of the cable shown being illustrated in side elevation.

Figure 3 is an end view of the hook.

Figure 4 is a perspective view of the link.

Figure 5 is a detail view illustrating how the sling is adaptable to a load of extremely small cross section.

In carrying out the invention provision is made of a sling appliance generally designated 1. This comprises a hook 2 and a link 3. The base 4 of the hook terminates in a ferrule 5 which has a bore tapering at 6 and ending in a cylindrical portion 7 at the small end.

The purpose of the ferrule, and particularly of the tapering bore, is to receive one end of a sling cable, rope or some equivalent 8, which end has been enlarged at 9 by knotting or otherwise. The enlarged end occupies the tapering bore 6, and the purpose of the enlargement is to prevent the cable from being pulled out of the cylindrical portion 7.

At a place adjoining the foregoing cylindrical portion the characteristic hook shape of the hook 2 is constructed to define a recess 10 by which the bight 11 (Fig. 1) of the cable 8 is received when the cable loop 12 is applied to the load 13. One of the outstanding features of the sling is that the cable loop 12 may be contracted to an exceedingly small compass.

The holding quality of the hook 2 is as effective when the cable loop 12 is applied to a load having a very small cross section as in Figure 5 as when applied to a larger load as in Figure 1. This facility is directly attributable to the peculiar shape of the hook, and especially to the disposition of the ferrule 5 in reference to the hook. This ferrule occupies a position at one side of the hook. A portion of it overhangs the recess 10, and in fact defines a part of the recess.

That portion of the cable 8 situated within the confines of the hook, namely that portion situated between the ferrule 5 and point 14 of the hook, will always remain straight and unbent. Thus that part of the cable immediately to the front of the point 14 will assume its curvature gradually, and the abruptness with which the curvature is assumed will depend upon the cross section of the load.

In Figure 1 the departure of the cable loop 12 from the point 14 of the hook is almost straight at 15, while in Figure 5 the corresponding part 16 assumes a more definite curvature, but in either instance the cable is enabled to adapt itself to the shape of the load along easy lines. There is no abrupt bending of the cable and since the ferrule 5 is situated at one side of the hook, rather than in line with the major axis of it, it follows that the loop 12 can be bent around and contracted to the sides of the load 13 (Fig. 5) to exceedingly small limits.

In order to guard against any accidental slipping out of the bight 11 from the recess 10 use is made of the link 3 for the purpose of arranging a closure. This link is movable along the cable 8 but the movement in the outward direction is limited by a stop 17 which may comprise a few wrappings of cord or wire or some equivalent.

The cross sectional contour of the bore of the link is oval (Fig. 4). The head 18 is broader than the nose 19 thus to afford an adequate bearing on the cable and to render any outward bending of the cable less abrupt. The inner terminals of the head are rounded outwardly at 20. The nose 19 has an internal ridge 21 which is intended to engage a rather sharp ridge recess 22 on the outside of the hook point 14. The configuration of the ridge 21 and recess 22 will serve to lock the link 3 in place when the sling is applied to the load. Very often the link will be pressed against the side of the load as well shown in Figures 1 and 5, thus further insuring its retention upon the point of the hook.

The operation is apparent from Figures 1 and 5 which showing needs only to be supplemented by the statement that prior to applying the sling, link 3 is drawn back against the stop 17 so that the hook 2 can be caught over the cable 8 and its bight 11 caused to rest in the recess 10. This forms the loop 12 around the load 13. The link 3 is slid toward the hook and fitted over the point 14 whereupon an upward pull on the cable 8 will draw the loop 12 tight. It is possible to make a very rapid connection and disconnection of the sling with the load.

A peculiar quality of the hook 2 is that the foregoing pull on the cable 8 will automatically center the hook so that it will hang in position directly over the load. This has the advantage of enabling a short and direct pull.

Even if the link 3 were omitted entirely, or inadvertently left in its resting position against the stop 17, the bight 11 would be held in the recess 10, notwithstanding because that part of the cable spanning the recess from the ferrule 5 to the point 14 would act as a closure. Since the direction of the bight 11 is at right angles to the adjoining part of the cable it follows that the pull on the cable will always tend to bear the cable against the point 14 and thus maintain the closure mentioned.

But it is intended to employ the link 3 thus to insure keeping the bight 11 in place. The link is especially advantageous when the sling is used as a tow line. In such an instance the hook and sling would be duplicated at the other end of the cable 8. Even though the cable should hang slack the hooks will remain in place and not become liable to disconnection.

Usually hoist-line slings employ hooks that are connected with the cable either by loops spliced in the cable or through one or more links connected between the hooks and spliced loops. Such loops, or eyes as they are often called, as well as links are herein eliminated thus making possible a closer application of the sling as well as enabling the adaptation thereof to very small loads as has already been pointed out in connection with Figure 5.

While the construction and arrangement of the improved hoist-line sling is that of a generally preferred form, obviously modifications and changes may be made without departing from the spirit of the invention or the scope of the claims.

I claim :—

1. A hoist-line sling comprising a cable, a hook having a point, and separate means by which the hook and cable are so connected that the cable will bear on the point when applied to a load.

2. A hoist-line sling comprising a cable, a hook having a point and a recess in which a bight of the cable is receivable when the cable is applied to a load, and separate means so connecting the hook and cable that the cable will bear on the point and provide a closure for the recess.

3. A hoist-line sling comprising a cable, a hook to which the cable is attached, said hook having a point, and a link applicable over the cable and hook point to retain a bight of the cable passed between the cable and hook.

4. A hoist-line sling comprising a cable having an enlargement at one end, a stop on the cable spaced from the enlargement, a hook having means to which the cable is secured through engagement therewith by its enlargement, a point being part of the hook and defining with a portion of said means a recess to receive a bight of the cable, and a link loose on the cable between the hook and stop, being engageable with the point to hold the cable against the point and effect a closure of the recess to retain the bight.

5. An appliance for hoist-line slings comprising a hook having means to which an end of the cable is attachable, a point on the hook defining a recess with a portion of said means, and a link arranged to be carried by the cable and capable of being fitted over the point to hold the cable against the point and produce a closure of the recess.

6. An appliance for hoist-line slings comprising a hook having means to which an end of the cable is securable, a point on the hook having a ridge recess and defining a bight recess with a portion of said means, and a link arranged to be carried by the cable and fitted over the point to produce a closure for the bight recess, said link having a ridge to then engage the ridge recess.

CHARLES SAMUEL NELSON.